United States Patent
Kasama (10) Patent No.: US 8,417,217 B2
(45) Date of Patent: Apr. 9, 2013

(54) PORTABLE INFORMATION TERMINAL, SECURITY METHOD, AND PROGRAM STORAGE MEDIUM

(75) Inventor: Koichiro Kasama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1294 days.

(21) Appl. No.: 11/905,320

(22) Filed: Sep. 28, 2007

(65) Prior Publication Data

US 2008/0305770 A1 Dec. 11, 2008

(30) Foreign Application Priority Data

Dec. 19, 2006 (JP) ................................. 2006-341443

(51) Int. Cl.
*H04M 3/16* (2006.01)
(52) U.S. Cl. ........................................ 455/411; 455/410
(58) Field of Classification Search .................. 455/410, 455/411
See application file for complete search history.

(56) References Cited

U.S. PATENT DOCUMENTS

| | | | | |
|---|---|---|---|---|
| 7,137,003 B2 * | 11/2006 | Krishnan et al. | ............... | 713/172 |
| 7,264,157 B2 * | 9/2007 | Ishizuka | ...................... | 235/383 |
| 7,773,982 B2 * | 8/2010 | Bishop et al. | ................. | 455/420 |
| 7,830,277 B2 * | 11/2010 | Lee | ................................. | 340/999 |
| 7,865,172 B2 * | 1/2011 | Blair et al. | .................... | 455/411 |
| 2001/0031651 A1 * | 10/2001 | Nakae et al. | .................. | 455/572 |
| 2005/0037736 A1 * | 2/2005 | Jung | ............................. | 455/411 |
| 2005/0159184 A1 * | 7/2005 | Kerner et al. | ................. | 455/558 |
| 2006/0135121 A1 * | 6/2006 | Abedi et al. | .................. | 455/410 |
| 2007/0015490 A1 * | 1/2007 | Munje et al. | ................. | 455/410 |
| 2008/0051101 A1 * | 2/2008 | Ha et al. | ...................... | 455/456.1 |
| 2010/0015952 A1 * | 1/2010 | Wood, III | ...................... | 455/411 |
| 2010/0099383 A1 * | 4/2010 | Yamagishi | .................... | 455/411 |
| 2010/0122350 A1 * | 5/2010 | Munje et al. | .................... | 726/28 |

FOREIGN PATENT DOCUMENTS

| | | |
|---|---|---|
| JP | 2000-276247 | 10/2000 |
| JP | 2002-325280 | 11/2002 |
| JP | 2002-330220 | 11/2002 |
| JP | 2006-109326 | * 4/2006 |

* cited by examiner

*Primary Examiner* — Lester Kincaid
*Assistant Examiner* — Mehmood B Khan
(74) *Attorney, Agent, or Firm* — Staas & Halsey LLP (57) ABSTRACT

A mobile phone, when it is stolen or lost, autonomously detecting and protecting by itself the data held inside, wherein a security managing unit performs a predetermined security operation based on the above detection results wherein when it judges there is "no user presence reaction" by a user presence monitoring unit and it judges the power is on by a power monitoring unit or when it judges that the power is being turned off and the power is turned back on, it locks the access to data, evacuates the data outside, or deletes the data in accordance with the results of judgment whether the phone is in range or out of range by a radio status monitoring unit.

14 Claims, 6 Drawing Sheets

PORTABLE INFORMATION TERMINAL, SECURITY METHOD, AND PROGRAM STORAGE MEDIUM

BACKGROUND OF THE INVENTION

1. Field of the Invention

The present invention relates to a mobile information terminal, more particularly a mobile information terminal provided with a security system for protecting data held inside. Further, it relates to a security method and a storage medium storing a security program for the same.

2. Description of the Related Art

As the above mobile information terminal, there are mobile phones, personal digital assistants (PDAs), etc. The following explanation will be given with reference to a mobile phone as a representative example.

Due to the increasing sophistication of functions of mobile phones in recent years, their data storing units are now storing huge amounts of a large variety of data. This also includes important data requiring secrecy. Therefore, if a mobile phone happens to be lost, it is necessary to protect the legitimate user of that mobile phone from theft of that important data etc. by malicious third parties. That is, the security of the above important data has to be secured.

Various methods have been proposed in the past for securing data security. For example, there are Japanese Patent Publication (A) No. 2006-109326, Japanese Patent Publication (A) No. 2002-325280, Japanese Patent Publication (A) No. 2000-276247, and Japanese Patent Publication (A) No. 2002-330220. Japanese Patent Publication (A) No. 2006-109326 discloses a transponder with a built-in RFID tag paired with a mobile phone as a mobile identification means.

Further, Japanese Patent Publication (A) No. 2002-325280 uses a status detecting means for detecting the state when the mobile phone is stolen. This status detecting means finds the location, detects acceleration, detects vibration, or detects inclination.

Further, Japanese Patent Publication (A) No. 2000-276247 judges if a mobile phone is in range enabling communication with a relay station and, when judging that it is in range, turns on the power of the mobile phone to set it into a usable state.

Still further, Japanese Patent Publication (A) No. 2002-330220 uses a specific data transmitter within a predetermined range of distance paired with a mobile phone holding its own specific data, compares specific data received from that specific data transmitter and that own specific data, and judges the mobile phone is lost or stolen and issues an alarm when they do not match.

Summarizing the problems to be solved by the invention, according to the method of Japanese Patent Publication (A) No. 2006-109326, a transponder is required in addition to the mobile phone, so the cost becomes higher and the two devices have to be simultaneously carried and therefore the user is inconvenienced. The same is true for the method of Japanese Patent Publication (A) No. 2002-330220. Further, according to the method of Japanese Patent Publication (A) No. 2000-276247, the only condition for judging theft is whether the phone is "in a communicable range". It is therefore difficult to determine if the phone has really been stolen.

On the other hand, the method of Japanese Patent Publication (A) No. 2002-325280 is similar to the present invention explained later in detail in the point of introducing a status detecting means. However, as the status detecting means in Japanese Patent Publication (A) No. 2002-325280, a global positioning system (GPS) device, acceleration sensor, posture angle sensor, etc. is envisioned. A mobile phone including any of these becomes larger in size.

SUMMARY OF THE INVENTION

An object of the present invention is to provide a mobile phone or other mobile information terminal able to realize the above status detecting means by utilizing originally existing functions without using an acceleration sensor or other special functional parts.

Another object of the present invention is to provide a security method and a storage medium storing a security program for the same.

To achieve the above object, there is provided a mobile phone autonomously detecting when it is stolen or lost and protecting by itself the data held inside, wherein a security managing unit (11) performs a predetermined security operation based on the above detection results wherein when it judges there is "no user presence reaction" by a user presence monitoring unit and it judges the power is on by a power monitoring unit (13) or when it judges that the power is being turned off and the power is turned back on, it locks the access to data, evacuates the data outside, or deletes the data in accordance with the results of judgment whether the phone is in range or out of range by a radio status monitoring unit (14).

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

A security system is formed in the mobile information terminal (for example, mobile phone). This security system is comprised of at least a user presence monitoring unit, a power monitoring unit, and a radio status monitoring unit and a security managing unit working with these monitoring units. The functions of these monitoring units are as follows:

The user presence monitoring unit monitors for the presence of the user, the power monitoring unit monitors the on/off state of the power, and the radio status monitoring unit monitors if the phone is out of range or in range of the service area. The security managing unit autonomously determines and executes the security method for the data held inside in accordance with the results of monitoring by the above monitoring units.

The user presence monitoring unit can for example be realized by an easily obtainable infrared sensor. Simple, small-size functional parts may just be introduced. That is, the above-mentioned GPS, transponder, and other large sized, sophisticated function parts are unnecessary.

The user presence monitoring unit may for example intermittently operate at 1-minute intervals since it monitors the slow phenomenon of the presence of the human body. Therefore, an extremely low power consuming security system can be realized.

The security operation is activated only when no human body is detected, so further lower power consumption becomes possible.

When a malicious third party tries to turn off the power during the period when the function of detection of the human body is off, the instruction to turn off the power is forcibly invalidated. This is because if turning off the power here, the succeeding above-explained operation "in accordance with the results of monitoring by the radio status monitoring unit" can no longer be performed. Note that when the legitimate user tries to turn off the power, the power can be turned off in accordance with that instruction. The reason is that it is assumed that the legitimate user will constantly carry the mobile phone with him or her (state where presence of user is detected) and the above security operation will not be activated.

Further, it is possible to select whether to (a) lock access to the data, (b) evacuate the data outside, or (c) delete the data and thereby possible to establish levels of data protection in accordance with the results of monitoring of the radio status monitoring unit, that is, in accordance with whether the phone is out of range or in range and further in accordance with the length of the period while out of range when out of range.

Further, the mobile phone itself can perform a security operation based on the autonomous judgment of the mobile phone without the aid or instruction of the user (legitimate user) or outside carrier at all in any of the above operations.

Figure 1:
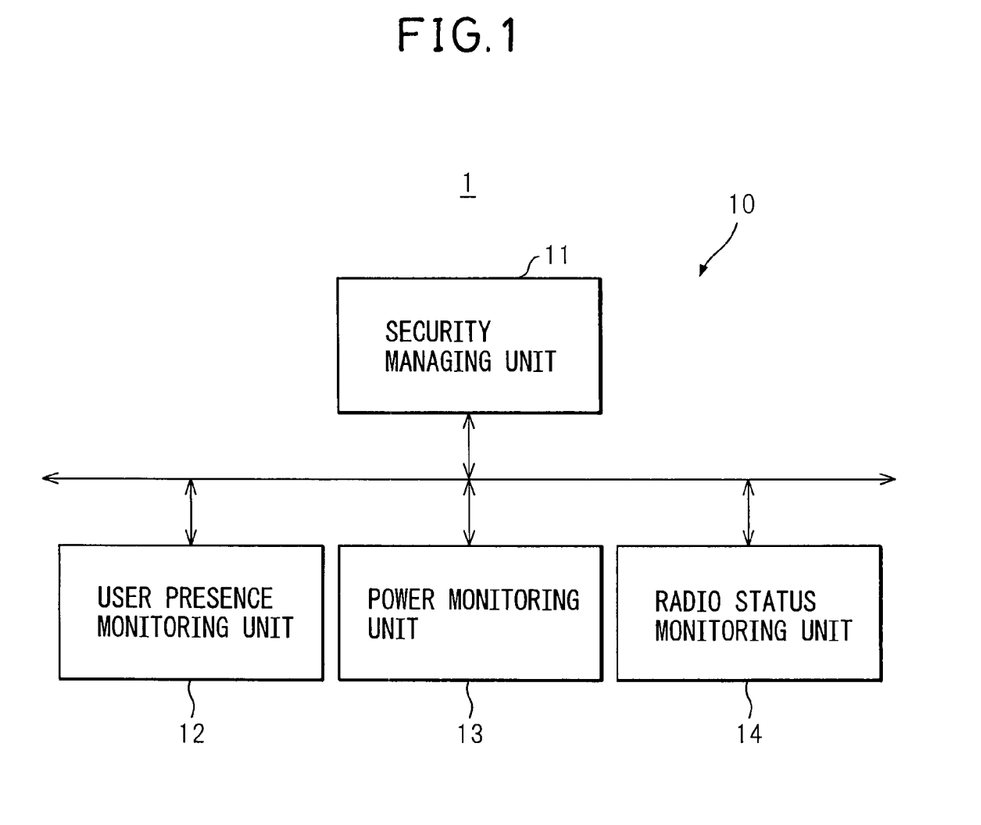
FIG. 1 is a view showing the configuration of the present invention.

FIG. 1 is a view showing the configuration of the present invention. In the figure, reference numeral 1 shows a mobile information terminal (hereinafter a mobile phone) in which a security system 10 is formed. The security system 10, as illustrated, is comprised of at least a user presence monitoring unit 12, a power monitoring unit 13, and a radio status monitoring unit 14 and a security managing unit 11 working with these monitoring units (12, 13, 14). Note that in practice, these are realized by the functions of a computer operating with a computer readable medium having a predetermined program. The functions of these monitoring units (12, 13, and 14) are as follows:

The user presence monitoring unit 12 monitors the presence of the user, while the power monitoring unit 13 monitors the on/off state of the power. The radio status monitoring unit 14 monitors if the phone is out of range or in range of the service area. Here, the security managing unit 11 autonomously determines and executes a security method for data held inside in accordance with the results of monitoring by the monitoring units (12, 13, 14).

Further, specifically, the security managing unit 11 autonomously determines and executes whether to lock access to data held inside, evacuate the data outside, or delete the data in accordance with the results of monitoring by the radio status monitoring unit 14 when the user presence monitoring unit 12 judges there is no user presence reaction and the power monitoring unit 13 judges that the power is on.

Figure 2:
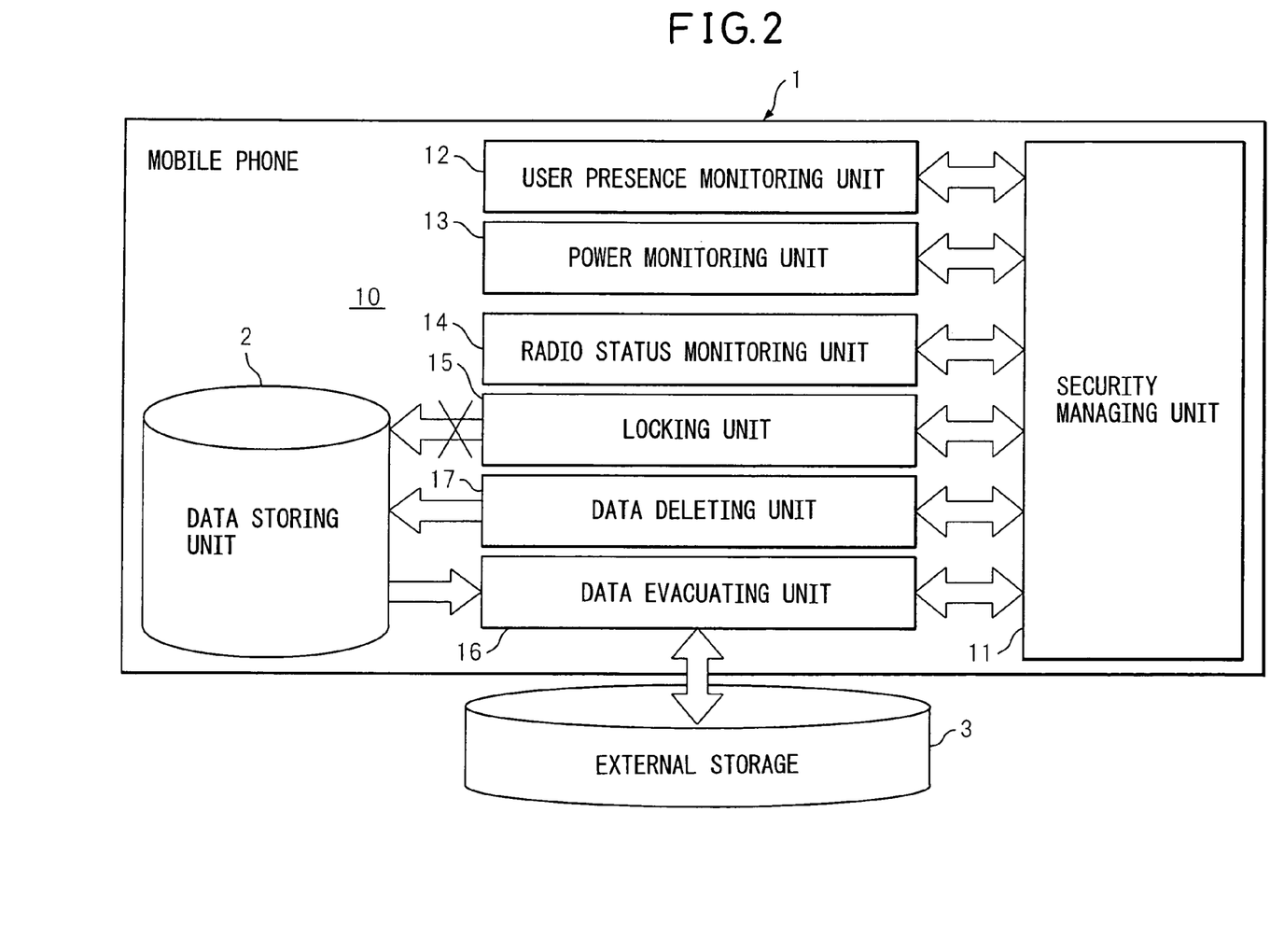
FIG. 2 is a view showing the basic configuration of a mobile phone according to an embodiment of the present invention.

FIG. 2 is a view of the basic configuration of a mobile phone based on an embodiment of the present invention. Note that throughout the figures, similar elements are assigned the same reference numerals or symbols.

In FIG. 2, the elements specifically shown in addition to the configuration of FIG. 1 include a data storing unit 2 for holding data inside it, a locking unit 15 for locking access to the data, a data evacuating unit 16 for evacuating that data outside, and a data deleting unit 17 for deleting that data.

The security managing unit 11 works with the units (15, 16, 17) and the above-mentioned monitoring units (12, 13, 14) to form a security system 10.

Among the monitoring units (12, 13, 14), looking at the user presence monitoring unit 12, this user presence monitoring unit 12 works with the user sensor and intermittently monitors for the presence of the user by a predetermined cycle. When the fact that the user (for example, a malicious third party) has instructed the power be turned off is notified by the power monitoring unit 13 during the off period after the user presence monitoring unit 12 intermittently monitoring for the presence of the user judges that "no user sensed", the security managing unit 11 discards that instruction and forcibly maintains the power on. This is so as not to allow the succeeding security operation to be stopped. This being so, this security operation is next transferred to the radio status monitoring unit 14 where it is judged if the phone is out of range or in range of the service area.

If the result of monitoring by the radio status monitoring unit 14 is that the phone is out of range, the length of the period while it is out of range is counted. In this case, if the out-of-range state does not continue for over a predetermined certain period (for example, 2 hours), access to the data held in the mobile phone is locked. On the other hand, if access to data is locked when the out-of-range state exceeds a predetermined certain time, it is unlocked and the data is deleted.

Conversely, when the result of monitoring by the radio status monitoring unit 14 is that the phone is in range, wireless communication with the outside is possible, so when the access to the data is locked, it is unlocked and that data is evacuated to the outside. In this case, the data is evacuated to an external storage 3 able to communicate with the mobile phone 1 through a wireless line (see 28 of FIG. 3).

Figure 3:
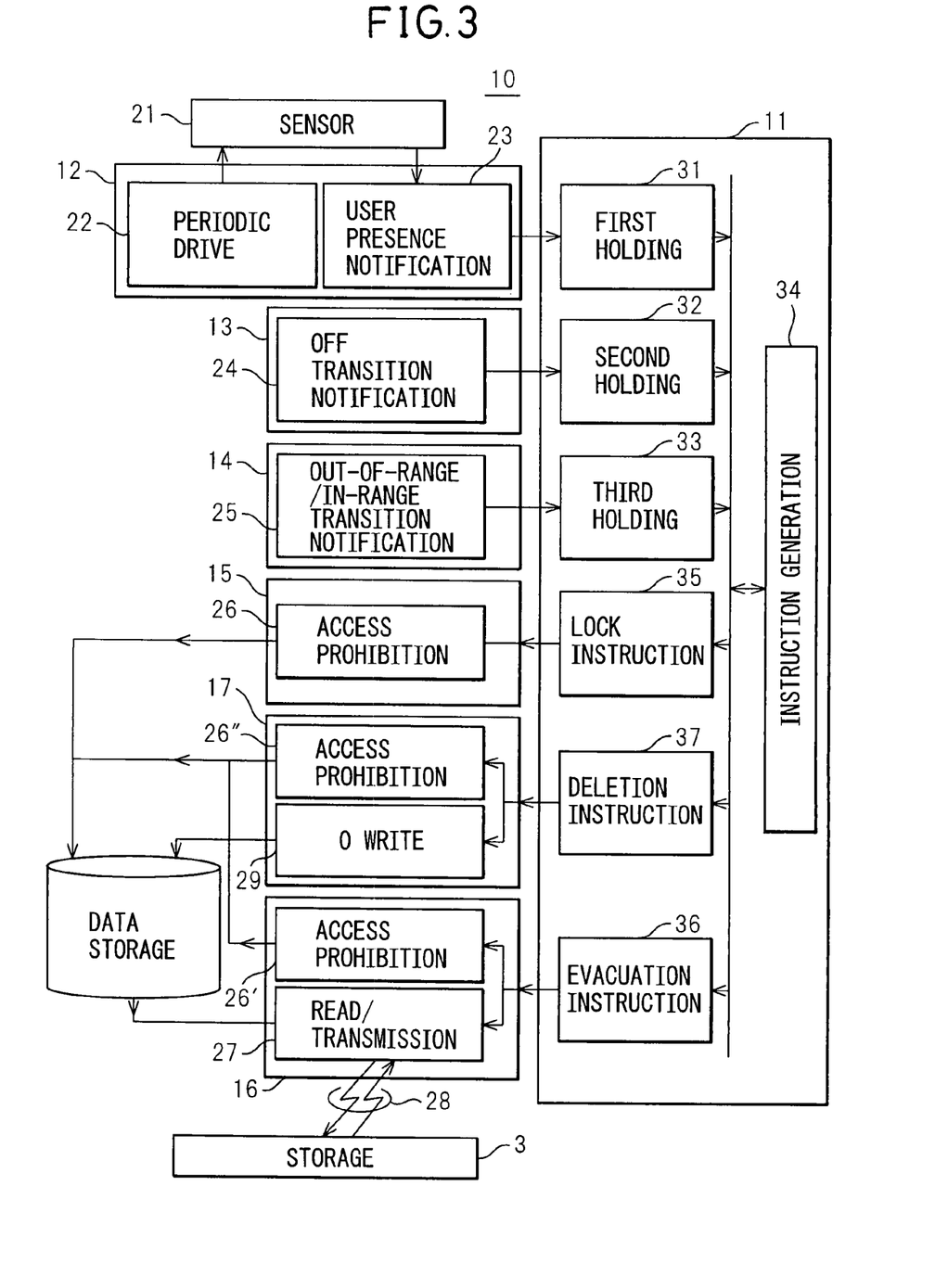
FIG. 3 is a view showing a detailed example of a security system 10 shown in FIG. 2.

FIG. 3 is a view of a detailed example of the security system 10 shown in FIG. 2. In the figure, the user presence monitoring unit 12 repeatedly periodically starts up and stops a user sensor 21, for example, an infrared sensor, by a periodic drive unit 22. When there is a change in status from "a state of user presence reaction at the time of startup of the user sensor 21" or when there is a change in status from "a state of no user presence reaction for a certain time (several cycles)", the status of no user presence reaction is notified from the user presence notifying unit 23 to the security managing unit 11.

The power monitoring unit 13 notifies the state of transition from the power on state to the power off state, from an off transition notifying unit 24 to the security managing unit 11 only when this is detected.

The radio status monitoring unit 14 notifies the change in status from in range to out of range or from out of range to in range, from an in-range/out-of-range transition notifying unit 25 to the security managing unit 11 only when this is detected.

The security managing unit 11 starts up the above-mentioned units (15, 16, 17) based on the above notification information from the monitoring units (12, 13, 14). The locking unit 15 receives an instruction from the security managing unit 11 and blocks all access to the data storing unit 2 by an access prohibiting unit 26.

The data evacuating unit 16 receives an instruction from the security monitoring unit 11 and sends all data of the data storing unit 2 by a data reading/transmitting unit 27 through the wireless line 28 to an external storage 3. This external storage 3 is a storage of an external server. Alternatively, it is a storage of a personal computer of an individual user. In this case, the evacuation data is attached to a specific format of mail and sent to the personal computer. Note that during the data reading/transmitting processing, all access to the data storing unit 2 is blocked by the access prohibiting unit 26', so as to transfer the current data of the data storing unit 2 outside as it is without change.

When the mobile phone returns to the legitimate user after evacuation of the data, the original data can be restored to the data storing unit 2. In this case, the data evacuating unit 16 operates as a data acquiring unit (not shown).

The data deleting unit 17 receives an instruction from the security managing unit 11 and writes the data 0 in all addresses of the data storing unit 2 by a 0-writing unit 29. When writing the data 0, the access prohibiting unit 26' blocks writing of new data, as well.

The above operation is executed based on an instruction from the security managing unit 11. For this, the security managing unit 11

(i) holds information (no user presence reaction) from the user presence notifying unit 23 at a user presence holding unit (first holding unit) 31, (ii) holds information, from the off transition notifying unit 24, indicating transition to the power off state, in an off transition information holding unit (second holding unit) 32, and (iii) holds information from an in-range/out-of-range notifying unit 25 in an in-range/out-of-range transition information holding unit (third holding unit) 33.

The security managing unit 11 instructs various types of processing by a processing instruction generating unit 34 based on various held information of the first to third holding units (31, 32, 33). That is, it (iv) instructs locking of the data access by a lock instructing unit 35 to an access prohibiting unit 26 when it judges there is no user presence reaction by the above (i), judges that the power is on by the above (ii), and judges that the phone is out of range by the above (iii), (v) sends a data deletion instruction from a deletion instructing unit 37 to a 0-writing unit 29 when this out-of-range state continues for a certain time or more, and (vi) sends an instruction for data evacuation from an evacuation instructing unit 36 to the data reading/transmitting unit 27 when it judges there is no user presence reaction by the above (i), judges that the power is on by the above (ii), and judges that the phone is in range by the above (iii).

The operations of the above (i) to (vi) will become clearer with reference to a flow chart. This is shown in the figures.

Figure 4:
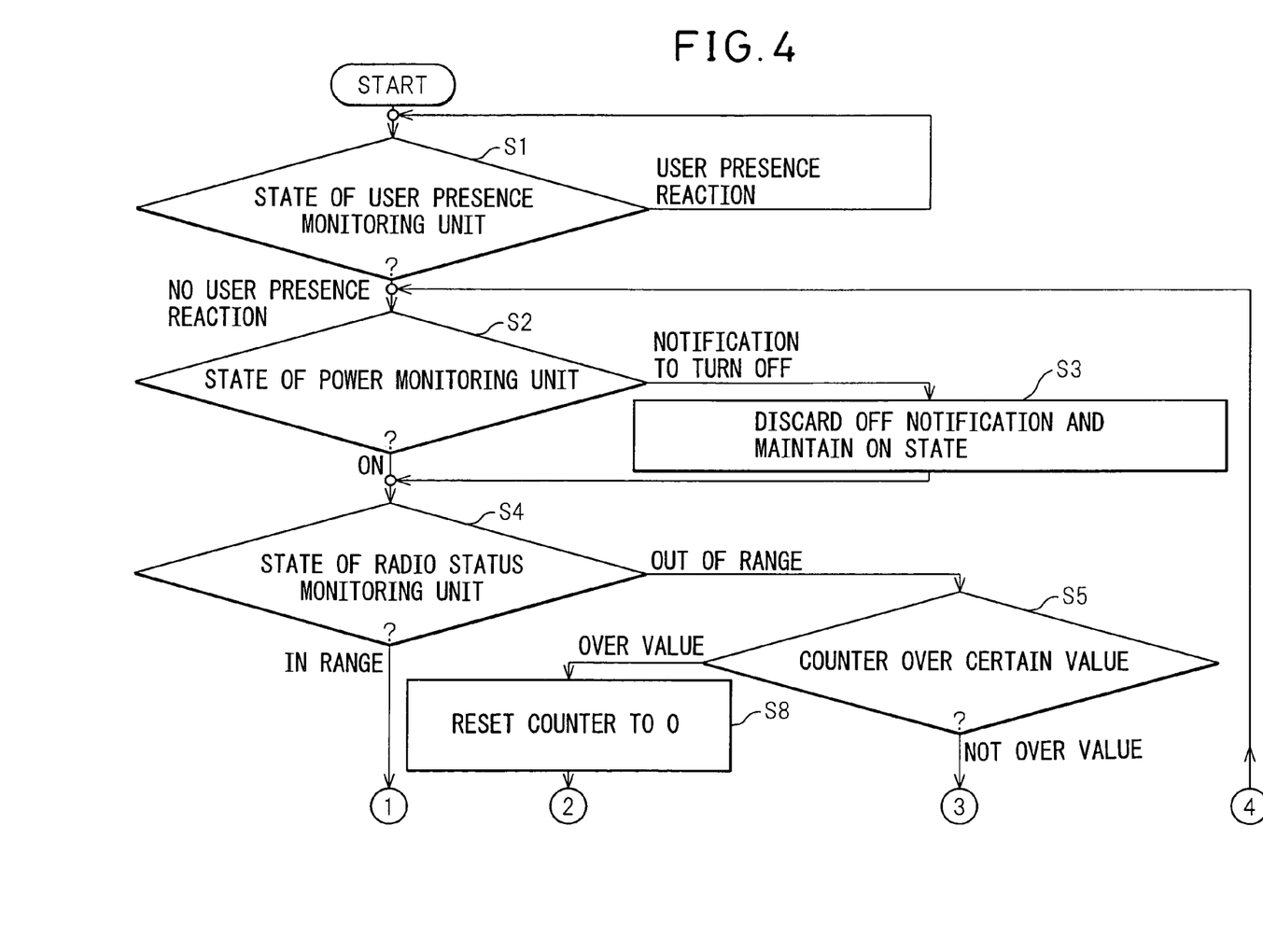
FIG. 4 is part 1 of a flow chart showing the operation of a security managing unit 11.
Figure 5:
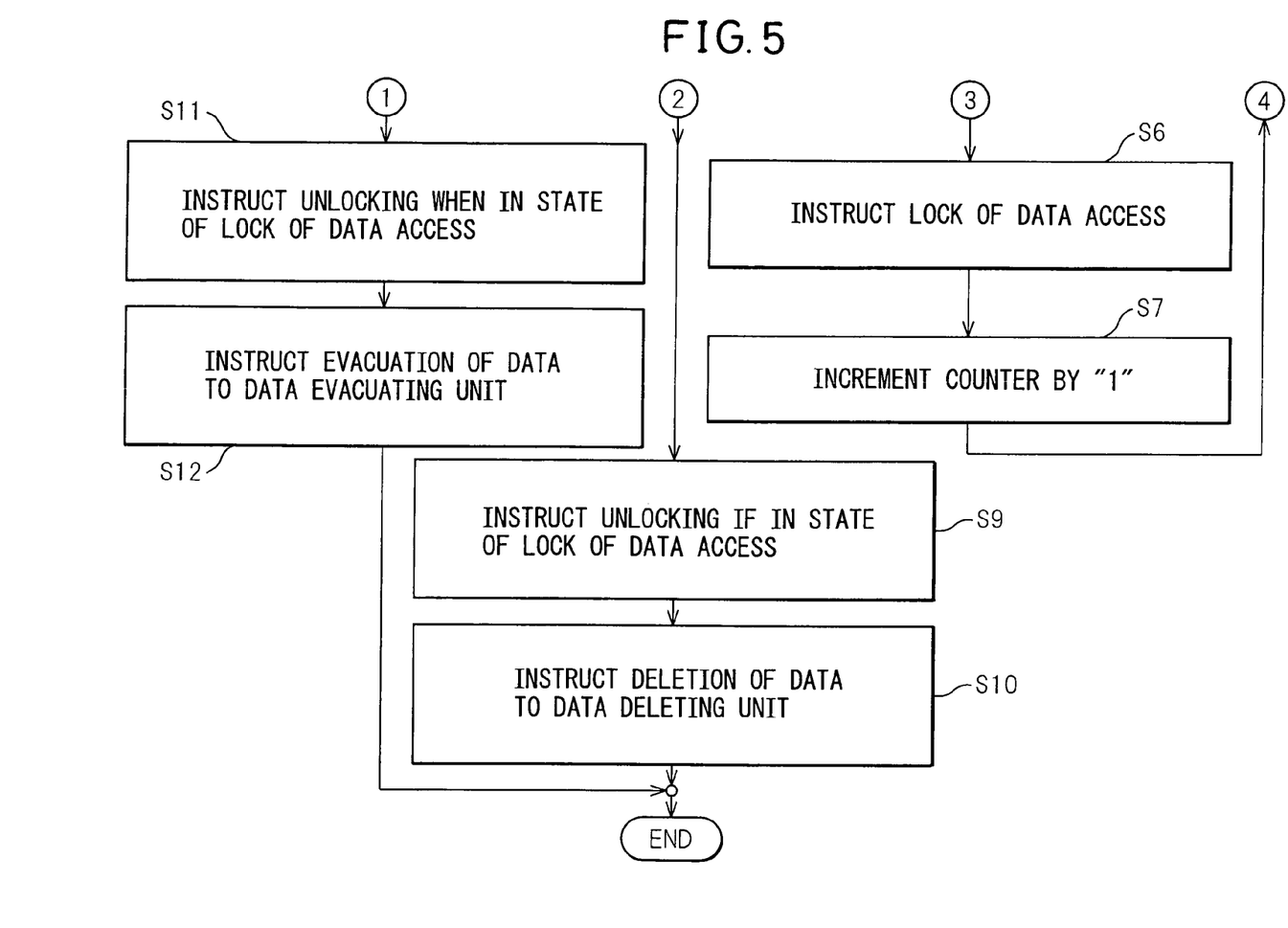
FIG. 5 is part 2 of a flow chart showing the operation of a security managing unit 11.

FIG. 4 is part 1 of a flow chart showing the operation of the security managing unit 11, while FIG. 5 is part 2 of the flow chart.

Step S1: Whether the state of the user presence monitoring unit 12 is "user presence reaction" or "no user presence reaction" is judged. If changing in state to "no user presence reaction", the routine proceeds to the next step S2;

Step S2: In this step, whether the state by the power monitoring unit 13 is "on" or "notification to turn off" is judged. If the latter, Step S3: The "notification to turn off" is discarded and the state of power being on is maintained.

Step S4: Whether the phone is out of range or in range is judged by the radio status monitoring unit 14; and Step S5: If judged out of range, the length of the period for which the out-of-range state continues is counted by a counter. This counter is for example held by the radio status monitoring unit 14 of FIG. 3.

Step S6 (FIG. 5): If the count of the counter is not over a predetermined certain value, the locking unit 15 is instructed to lock data access;

Step S7: The counter is incremented by "1", then the above steps S2→(S3)→S4→S5→S6 are repeated; and Step S8: If the count of the counter is over the certain value, the counter is reset to "0".

Step S9: Further, if in a state of lock of data access, unlocking is instructed, then Step S10: Deletion of data is instructed to the data deleting unit 17.

Step S11 (FIG. 5): On the other hand, when the phone is judged to be in range at the above step S4, if in a state of lock of data access, unlocking is instructed, then Step S12: Evacuation of data to the external storage 3 is instructed to the data evacuating unit 16.

Figure 6:
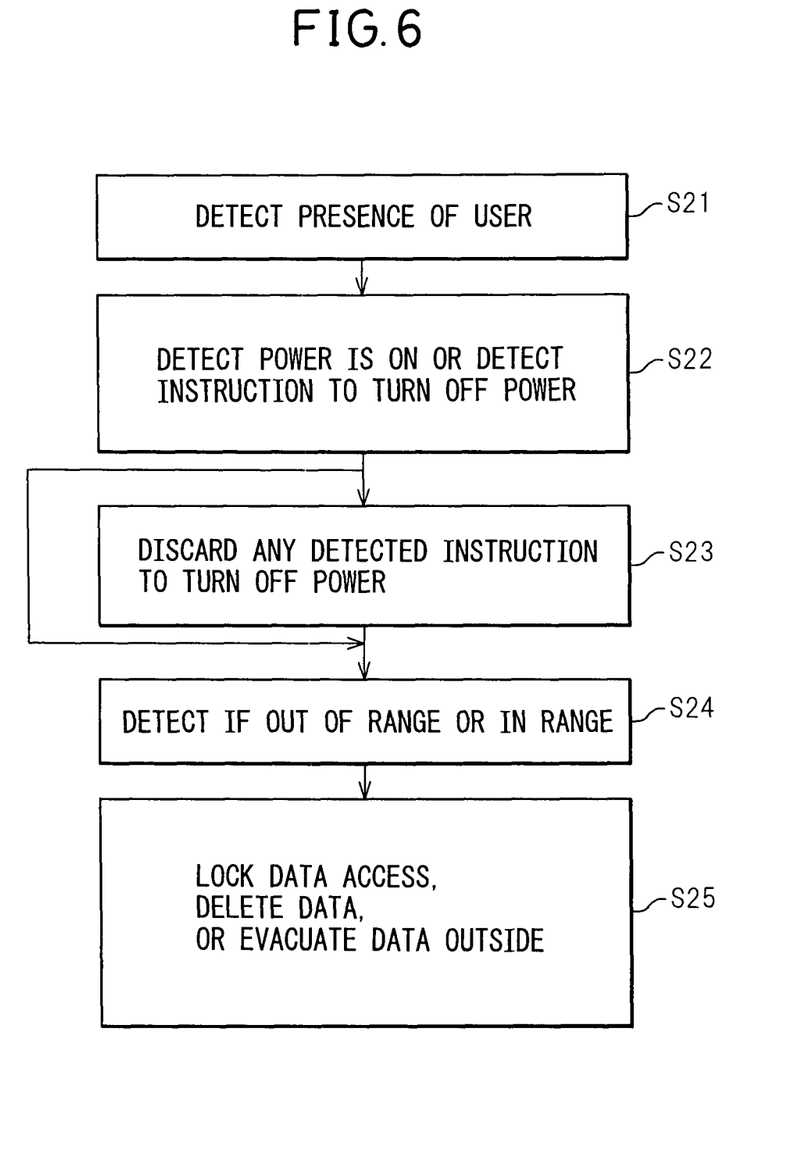
FIG. 6 is a view showing a security method according to an embodiment of the present invention.

The above flow chart can also be expressed as a security method, so this is shown in the figure. FIG. 6 is a view showing a security method according to an embodiment of the present invention.

First step S21: The presence of a user is judged intermittently by a predetermined cycle.

Second step S22: When it is judged at the first step S21 that the user is not present, it is judged if the power is on or if there is an instruction to turn off the power, while Third step S23: When there is an instruction to turn off the power at the second step S22, that instruction is discarded and the power is forcibly maintained on.

Fourth step S24: When it is judged that the power is on at the second step S22 or when the power is maintained on at the third step S23, it is judged that the phone is out of range of the service area; and Fifth step S25: When it is judged that the phone is out of range in the fourth step S24, access to the data held inside is locked or the data is deleted. On the other hand, when it is judged to be in range, the data is evacuated outside.

At the above fifth step S25, when it is judged that the out-of-range state is not over a predetermined certain time, access to the data is locked, while when it is judged that the certain time is exceeded, the data is deleted. On the other hand, when in range, the data is evacuated to the outside.

Further, at the above fifth step S25, locked access to data is unlocked when deleting the data and when evacuating data outside.

In the explanation regarding FIG. 1 given above, it was explained that the present invention was realized by the functions of a computer operating with a storage medium storing a predetermined program. The program for this is comprised of instructions for having a computer execute a routine 1 to a routine 5 corresponding to steps S21 to S25 shown in FIG. 6.

While the invention has been described with reference to specific embodiments chosen for purpose of illustration, it should be apparent that numerous modifications could be made thereto by those skilled in the art without departing from the basic concept and scope of the invention.

The invention claimed is:

1. A mobile information terminal, comprising:
   a computer mounted in said mobile information terminal, the computer including
   a user presence monitoring unit configured for monitoring a presence of a user, a power monitoring unit configured for monitoring an on/off state of power for driving the mobile information terminal, a radio status monitoring unit configured for monitoring if the terminal is out of range or in range of the service area provided by an outside carrier, and a security managing unit configured for autonomously determining and executing a security method for data held inside in accordance with results of monitoring by said user presence monitoring unit, said power monitoring unit and said radio status monitoring unit, wherein when said security managing unit is notified by said power monitoring unit that the user has provided instructions to turn on the power during an off period of intermittent monitoring by said user monitoring unit and when said user presence monitoring unit judges there is no user present, said security managing unit forcibly maintains the power on while discarding the instructions from the user.

2. A mobile information terminal as set forth in claim 1, wherein said security managing unit locks the access to data held inside, evacuates the data outside, or deletes the data in accordance with the results of monitoring by said radio status monitoring unit when said user presence monitoring unit judges there is "no user presence reaction" and said power monitoring unit judges the power is on.

3. A mobile information terminal as set forth in claim 1, further having a data storing unit for holding said data inside, a locking unit for locking access to said data, a data evacuating unit for evacuating said data outside, and a data deleting unit for deleting said data.

4. A mobile information terminal as set forth in claim 1, wherein said user presence monitoring unit cooperates with a user sensor and intermittently monitors for the user by a predetermined cycle.

5. A mobile information terminal as set forth in claim 2, which locks access to said data when the result of monitoring by said radio status monitoring unit is that the terminal is out of range and a state of being out of range does not continue for more than a predetermined certain time, while unlocks access and deletes said data if access to said data is locked when the state of being out of range exceeds a predetermined certain time.

6. A mobile information terminal as set forth in claim 2, which unlocks access when access to said data is locked and evacuates said data to the outside when the result of monitoring by said radio status monitoring unit is that the terminal is out of range.

7. A mobile information terminal as set forth in claim 2, which evacuates said data to an external storage able to be communicated with through a wireless line.

8. A security method for a mobile information terminal, the method employing a computer and comprising:

intermittently judging by a user presence monitoring unit a presence of a user by a predetermined cycle;

judging by a power monitoring unit if power for driving the mobile information terminal is on or there is an instruction to turn the power off when the user presence monitoring unit determines there is no user;

discarding the instruction and forcibly maintaining the power on by an off transition notification holding unit when there is an instruction to turn the power off and the user presence monitoring unit determines there is no user;

judging by a radio status monitoring unit that the terminal is out of range or in range of a service area provided by an outside carrier when the power monitoring unit determines that the power is on in said judging by the radio status monitoring unit or when the power is forcibly maintained on in said discarding; and locking access to data held inside or deleting said data by a locking unit when the radio status monitoring unit determines that the terminal is out of range in said judging by the radio status monitoring unit while evacuating said data outside when the radio status monitoring unit determines that the terminal is in range, wherein the user presence monitoring unit, the power monitoring unit, the off transition notification holding unit, the radio status monitoring unit and the locking unit are provided by the computer, and when a security managing unit is notified by the power monitoring unit that the user has provided instructions to turn on the power during an off period of intermittent monitoring by the user presence monitoring unit and when the user presence monitoring unit judges there is no user present, the security managing unit forcibly maintains the power on while discarding the instructions by the user.

9. A security method for a mobile information terminal as set forth in claim 8, which locks access to said data when it is judged that a state of being out of range does not continue for more than a predetermined certain period in said locking, and deletes said data when it is judged that the predetermined certain time has been exceeded, and evacuates said data to the outside when the terminal is in range.

10. A security method for a mobile information terminal as set forth in claim 9, which unlocks access to said data when deleting said data and when evacuating said data outside in said locking.

11. A mobile information terminal, comprising:
a computer mounted in said mobile information terminal, the computer including
a user presence monitoring unit configured for monitoring a presence of a user for driving the mobile information terminal,
a power monitoring unit configured for monitoring an on/off state of power for driving the mobile information terminal, and
a security managing unit configured for managing security in accordance with results of monitoring by respective monitoring units, said security managing unit invalidating any power off operation when said user presence monitoring unit judges the user is not present, when said power monitoring unit detects a power off operation,
wherein when said security managing unit is notified by said power monitoring unit that the user has provided instructions to turn off the power during an off period of intermittent monitoring by said user presence monitoring unit and when said user presence monitoring unit judges there is no signal present, said security managing unit forcibly maintains the power on while discarding the instructions by the user.

12. A mobile information terminal, comprising:
a computer mounted in said mobile information terminal, the computer including
a user presence monitoring unit configured for monitoring a presence of a user for driving the mobile information terminal,
a signal status monitoring unit configured for monitoring a state of reception of a signal from an outside carrier,
a power monitoring unit configured for monitoring an on/off state of power for driving the mobile information terminal, a storing unit configured for storing information, and a security managing unit configured for managing security in accordance with results of monitoring by said signal status monitoring unit, said security managing unit disabling access to information stored in said storing unit when said signal status monitoring unit judges that no signal is being received, wherein when said security managing unit is notified by said power monitoring unit that the user has provided instructions to turn off the power during an off period of intermittent monitoring by said user presence monitoring unit and when said signal status monitoring unit judges there is no signal present, said security managing unit forcibly maintains the power on while discarding the instructions by the user.

13. A mobile information terminal as set forth in claim 12, wherein said information terminal is provided with a timer means for counting time elapsed from when the signal was no longer received, and said security managing unit deletes information stored in said storing unit when said timer means determines that a predetermined time has elapsed.

14. A non-transitory computer readable medium having a program stored therein to execute operations, comprising:

a first routine of intermittently judging a presence of a user by a predetermined cycle, a second routine of judging if power for driving the mobile information terminal is on or there is an instruction to turn the power off when said first routine determines that there is no user, a third routine of discarding the instruction and forcibly maintaining the power on when there is an instruction to turn the power off at said second routine, a fourth routine of judging that the terminal is out of range or in range of the service area provided by an outside carrier when said second routine determines that the power is on or when the power is kept on by said third routine, and a fifth routine of locking access to data held inside or deleting said data when it is judged that the terminal is out of range at said fourth routine while evacuating said data outside when it is judged that the terminal is in range, wherein when said first routine notifies that the user has provided instructions to turn on the power during an off period of intermittent monitoring by said first routine and when said first routine judges there is no user present, the power is forcibly maintained on while discarding the instructions by the user.

* * * * *